(12) United States Patent
Kuroda et al.

(10) Patent No.: US 6,255,433 B1
(45) Date of Patent: Jul. 3, 2001

(54) ONE-PACKAGE THIXOTROPIC POLYURETHANE RESIN COMPOSITION

(75) Inventors: Kenji Kuroda; Masamitsu Miyagawa; Masahiro Miwa, all of Osaka (JP)

(73) Assignee: Takeda Chemical Industries, Ltd., Osaka (JP)

( * ) Notice: Subject to any disclaimer, the term of this patent is extended or adjusted under 35 U.S.C. 154(b) by 0 days.

(21) Appl. No.: 09/332,911

(22) Filed: Jun. 15, 1999

(30) Foreign Application Priority Data

Jun. 19, 1998 (JP) .................................................. 10-189750

(51) Int. Cl.$^7$ .................................................... C08G 18/10
(52) U.S. Cl. ................................ 528/49; 528/59; 528/73; 524/267; 524/443
(58) Field of Search ................................ 528/73, 49, 59; 524/267, 443

(56) References Cited

U.S. PATENT DOCUMENTS

| 3,743,626 | 7/1973 | Emmons | 260/77.5 |
|---|---|---|---|
| 4,071,505 | * 1/1978 | Meckel et al. | 528/73 |
| 5,091,444 | * 2/1992 | Bauer et al. | 523/209 |
| 5,473,043 | * 12/1995 | Maki et al. | 528/60 |
| 5,747,627 | * 5/1998 | Kimura et al. | 525/452 |

FOREIGN PATENT DOCUMENTS

| 20324/88 | 2/1990 | (AU) . |
|---|---|---|
| 6-293821 | 10/1994 | (JP) . |

* cited by examiner

*Primary Examiner*—Rachel Gorr
(74) *Attorney, Agent, or Firm*—Wenderoth, Lind & Ponack, L.L.P.

(57) ABSTRACT

A one-package thixotropic polyurethane resin composition comprising 10 to 90% by weight of a urethane prepolymer having a terminal free isocyanate group(a) which is obtained by reacting a polyisocyanate(b) with a compound having two or more active hydrogens(c), a monool(d) and an (N-hydroxyalkyl-oxazolidine compound(e), 0.1 to 20% by weight of hydrophobic fine powder silica(f) and 0.01 to 3.0% by weight of an oxazolidine-ring opening accelerator (g) is suitable for the use as a low modulus type sealant excellent in storage stability and curability and having low modulus and controlled foaming.

5 Claims, No Drawings

ONE-PACKAGE THIXOTROPIC POLYURETHANE RESIN COMPOSITION

FIELD OF THE INVENTION

The present invention relates to a one-package thixotropic polyurethane resin composition excellent in storage stability and curability and having low modulus and controlled foaming.

BACKGROUND OF THE INVENTION

Urethane prepolymers having terminal free isocyanate groups can be cured with moisture contained in the air or a substrate at room temperature, and have been employed for sealants, waterproofing materials, floor covering materials, wall covering materials, paving materials, coatings, adhesives and the like because of their excellent properties such as physical properties of the cured products obtained therefrom and adhesiveness. However, drawbacks to deteriorate their physical properties and appearance by foaming caused by generation of carbon dioxide gas associated with curing have been pointed out.

For the purpose of preventing foaming caused by the generation of carbon dioxide gas when the curing of such urethane prepolymers proceeds, AU-B-20324/88, U.S. Pat. No. 3,743,626, U.S. Pat. No. 5,473,043 and Japanese unexamined patent publication No. 293821/1994 and the like propose to use oxazolidine compounds.

In general, the use of the oxazolidine compounds for preparing urethane prepolymers causes the increase in crosslinking density of the cured products due to the act of the oxazolidine compounds as a crosslinking agent. The modulus of the cured products also increases with the increase in the crosslinking density. Heretofore, the use of such oxazolidine compounds for urethane prepolymers for the sealants has a problem that joint following-up properties of sealants are deteriorated due to the excessively high modulus of the cured products.

Although many sealants usually include thixotropic agents such as fine powder silica and surface-treated calcium carbonate, the hydrophilic fine powder silica, which has much moisture attaching thereon, causes a problem that sealants become viscous during storage. The surface-treated calcium carbonate is problematic in that the surface-treating agent elutes during storage and then coheres to form solid which deteriorates the appearance of the sealants.

SUMMARY OF THE INVENTION

The present inventors have intensively studied to find that a one-package thixotropic polyurethane resin composition comprising a urethane prepolymer having a terminal free isocyanate group(a) which is obtained by reacting a polyisocyanate(b), a compound having two or more active hydrogen(c), a monool(d) and an N-hydroxyalkyl-oxazolidine compound(e), hydrophobic fine powder silica(f) and an oxazolidine-ring opening accelerator(g) excels in storage stability and curability, and is suitable as a low modulus-type sealant having low modulus and controlled foaming, and have accomplished the present invention on the basis of that finding. Namely, the present invention provides:

1. A one-package thixotropic polyurethane resin composition comprising 10 to 90% by weight of a urethane prepolymer having a terminal free isocyanate group(a) which is obtained by reacting a polyisocyanate(b) with a compound having two or more active hydrogens(c), a monool(d) and an N-hydroxyalkyl-oxazolidine compound (e), 0.1 to 20% by weight of hydrophobic fine powder silica(f) and 0.01 to 3.0% by weight of an oxazolidine-ring opening accelerator(g).

2. The one-package thixotropic polyurethane resin composition according to 1, wherein the component(f) has a hydrophobic degree of 30% or more.

3. The one-package thixotropic polyurethane resin composition according to 1, wherein the component(d) has an average molecular weight of 100 to 3000.

4. The one-package thixotropic polyurethane resin composition according to 1, wherein the component(a) has an isocyanate group content of 0.5 to 5.0% by weight based on the whole composition.

5. The one-package thixotropic polyurethane resin composition according to 1, wherein the component(a) is obtained in 1.3 to 5.0 of an NCO/H equivalent ratio of an NCO group in the component(b) relative to an active hydrogen in the component(c), 2 to 50 of an NCO/OH equivalent ratio of an NCO group in the component(b) relative to an OH group in the component(d) and 2 to 10 of an NCO/OH equivalent ratio of an NCO group in the component(b), excepting that for reacting with the active hydrogen in the component(c) and the OH group in the component(d), relative to an OH group in the component(e).

6. The one-package thixotropic polyurethane resin composition according to 1, wherein the component(e) is a compound represented by the formula (I):

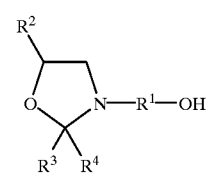

(I)

wherein $R^1$ represents a $C_{2-5}$ alkylene group, $R^2$ represents a hydrogen or a $C_{1-3}$ alkyl group, $R^3$ and $R^4$ are identical of different and represent a hydrogen or a $C_{1-20}$ hydrocarbon group.)

7. The one-package thixotropic polyurethane resin composition according to 1, which is a sealant.

DETAILED DESCRIPTION OF THE INVENTION

Examples of the polyisocyanate(b) used in the present invention include, but are not limited to, polyisocyanates conventionally used in production of polyurethane resin including aromatic diisocyanates such as m-phenylene diisocyanate, p-phenylene diisocyanate, 4,4'-diphenyl diisocyanate, 1,5-naphthalene diisocyanate, 4,4'-diphenylmethane diisocyanate, 2,4- or 2,6-tolylene diisocyanate, 4,4'-toluidine diisocyanate, 4,4'-diphenyl ether diisocyanate, aromato aliphatic diisocyanates such as 1,3- or 1,4-xylylene diisocyanate or a mixture thereof, aliphatic diisocyanates such as trimethylene diisocyanate, tetramethylene diisocyanate, hexamethylene diisocyanate, pentamethylene diisocyanate, 1,2-propylene diisocyanate, 1,2-butylene diisocyanate, 2,3-butylene diisocyanate, 1,3-butylene diisocyanate, 2,4,4- or 2,2,4-trimethylhexamethylene diisocyanate and 2,6-diisocyanatomethyl caproate, alicyclic diisocyanates such as 1,3-cyclopentene diisocyanate, 1,4-cyclohexane diisocyanate, 1,3-cyclohexane diisocyanate, 3-isocyanatomethyl-3,5,5-trimethylcyclohexyl isocyanate, 4,4'-methylenebis(cyclohexylisocyanate), methyl-2,4-cyclohexane diisocyanate, methyl-2,6-cyclohexane diisocyanate and 1,4-bis(isocyanatomethyl)cyclohexane, their carbodiimide-modified forms, biuret-modified forms, allophanate-modified forms, dimers and timers. These may be used alone or in combination with two or more of them.

Examples of the compounds having two or more active hydrogens(c) used in the present invention include low molecular weight diols with molecular weight of 350 of less such as an alkylene (C2-22) glycol, e. g., ethylene glycol, propylen glycol, 1,4-butylene glycol, 1,3-butylene glycol, 1,2-butylene glycol, 1,6-hexanediol, neopentyl glycol; poly(alkylene(C2-15) glycol), e.g., diethylene glycol, triethylene glycol, dipropylene glycol; other glycols such as cyclohexane dimethanol, hydrogenated bisphenol A, 1,4-dihydroxy-2-butene, 2,6-dimethyl-1-octene-3,8-diol, bishydroxyethoxybenzene, xylene glycol, bishydroxyethylene terephthalate; low molecular weight triols with molecular weight of 350 of less such as glycerin, 2-methyl-2-hydroxymethyl-1,3-propanediol, 2,4-dihydroxy-3-hydroxymethyl-pentane, 1,2,6-hexanetriol, 1,1,1-tris(hydroxymethyl)propane, 2,2-bis(hydroxymethyl)-3-butanol and other aliphatic triols (C8-20); low molecular weight diamines with molecular weight of 350 of less such as ethylenediamine, propylenediamine, hexamethylenediamine, hydrazine, 1,2-diaminoethane, 1,2-diaminopropane, 1,3-diaminopentane, 1,6-diaminohexane diaminotoluene, bis-(4-aminophenyl)methane and bis-(4-amino-3-chlorophenyl)methane; low molecular weight polyamines with molecular weight of 350 of less having a functionality of three or more such as diethylenetriamine, triethylene-tetramine, tetraethylenepentamine, pentaethylenehexamine and 2,2'-diaminodiethylamine; polyoxyalkylene polyols obtained by addition reactions of the foregoing low molecular weight diols, triols, diamines, polyamines having a functionality of three or more with alkylene oxides such as ethylene oxide and propylene oxide; polytetramethylene glycols obtained by a ring-opening polymerization of tetrahydrofuran; polyesterpolyols obtained by reacting at least one alcohol selected from the low molecular weight diols and the low molecular weight triols with a compound selected from carboxylic acids such as oxalic acid, malonic acid, succinic acid, methylsuccinic acid, glutaric acid, adipic acid, 1,1-dimethyl-1,3-dicarboxypropane, 3-methyl-3-ethylglutaric acid, azelaic acid, sebacic acid, other aliphatic dicarboxylic acids (C11-13) and HET acid, anhydrides of such carboxylic acids, e.g., oxalic anhydride, succinic anhydride and 2-alkyl(C12-18)succinic anhydrides, and halides of such carboxylic acids, e.g., oxalyl chloride, adipoyl chloride and sebacoyl chloride; polyesterpolyols obtained by a ring-opening polymerization of lactones such as ε-caprolactone and γ-valerolactone using the low molecular weight diols and low molecular weight triols as an initiator; polycarbonatepolyols obtained by a ring-opening polymerization of ethylene carbonate using the low molecular weight diols and low molecular weight triols as an initiator; and natural tat polyols such as castor oil; polyolefinpolyols such as polybutadienepolyol and polyisoprenepolyol and hydrated products thereof. These may be used alone or as mixtures of two or more of them.

The amount of the compounds having active hydrogens(c) used relative to the amount of the polyisocyanates(b) is preferably in NCO/H equivalent ratios of 1.3 to 5.0. The NCO/H equivalent ratios of less than 1.3 undesirably increase the viscosity of the prepolymer. The NCO/H equivalent ratios of more than 5.0 can not provide any desired physical properties of the cured products. From the viewpoints of the viscosity of the prepolymer and the physical properties of the cured products, the compound having active hydrogens are preferably used at NCO/H equivalent ratios of 1.5 to 4.5.

Examples of the monool(d) used in the present invention include aliphatic monoalcohols such as methanol, ethanol, propanol, butanol, pentanol, hexanol, octanol, cyclopentanol and dimethylcyclohexanol; aromatic and phenolic monoalcohols such as benzyl alcohol, phenol and cresol; (meth)acrylate-based monoalcohols obtained by esterification reaction of polyalcohol with (meth)acrylic acid, such as 2-hydroxyethyl (meth)acrylate, 2-hydroxypropyl (meth)acrylate, 2-hydroxybutyl (meth)acrylate, 4-hydroxybutyl (meth)acrylate, neopentyl glycol mono(meth)acrylate, 2-hydroxy-3-phenyloxypropyl (meth)acrylate, 4-hydroxycyclohexyl (meth)acrylate, trimethylolpropane di(meth)acrylate, pentaerythritol tri (meth)acrylate, tetramethylolmethane tri(meth)acrylate and polyalkylene glycol mono(meth)acrylates; polyoxyalkylene monools obtained by an addition reaction of alkylene oxides such as ethylene oxide and propylene oxide using the above monoalcohols as an initiator; polyester monools obtained by a ring-opening polymerization of lactones such as ε-caprolactone and γ-valerolactone using the low molecular weight monoalcohols as an initiator; and polycarbonate monools obtained by a ring-opening polymerization of ethylene carbonate using the low molecular weight monoalcohols as an initiator. These may be used alone or as mixtures of two or more of them.

Among these, monools having a molecular weight or average molecular weight of 100 to 3000 are particularly preferred because they can provide the prepolymer with suitable viscosity and physical properties of the cured products. The amount of such monools(d) used relative to the amount of the polyisocyanate(b) is preferably in NCO/OH equivalent ratios of 2 to 50. The NCO/OH equivalent ratios of less than 2 and more than 50 are not preferred because they can not provide any desired physical properties of the cured products. From the viewpoint of the physical properties of the cured products, the monools are preferably used in NCO/OH equivalent ratios of 3 to 40.

The N-hydroxyalkyl-oxazolidine compound(e) used in the present invention, that can be obtained by a dehydration condensation of a di(hydroxyalkyl)amine with a ketone or an aldehyde, may be any compound having a hydroxyl group at the terminal of an alkyl group attached to the nitrogen atom in the oxazolidine ring. Suitable examples of the N-hydroxyalkyloxazolidine compounds(e) are ones represented by the following general formula (I):

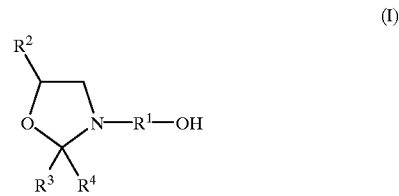

(wherein $R^1$ represents a $C_{2-5}$ alkylene group, $R^2$ represents a hydrogen or a $C_{1-3}$ alkyl group, $R^3$ and $R^4$ are identical or different and represent a hydrogen or a $C_{1-20}$ hydrocarbon group.)

In the general formula (I), examples of the alkylene group having 2 to 5 carbon atoms represented by $R^1$ include ethylene and isopropylene groups. Examples of the alkyl group having 1 to 3 carbon atoms represented by $R^2$ include methyl, ethyl, propyl and isopropyl groups. The hydrocarbon group having 1 to 20 carbon atoms represented by $R^3$ and $R^4$ may be saturated or unsaturated, aliphatic or aromatic hydrocarbon groups.

Suitable examples of $R^1$ include ethylene and isopropylene groups. Suitable examples of $R^2$ include a hydrogen atom and a methyl group. Suitable examples of $R^3$ and $R^4$ include aliphatic hydrocarbon groups having 1 to 7 carbon atoms such as methyl, ethyl, isopropyl and isopentyl groups, aromatic hydrocarbon groups having 6 to 10 carbon atoms such as phenyl, toluyl and benzyl groups. Especially, ones having a hydrogen atom as one of $R^3$ and $R^4$ are preferred from the viewpoint of storage stability of oxazolidine compounds.

Specific examples of suitable N-hydroxyalkyl-oxazolidine compounds include 2-isopropyl-3-(2-hydroxyethyl) oxazolidine, 2-(1-methylbutyl)-3-(2-hydroxyethyl)oxazolidine, 2-phenyl-3-(2-hydroxyethyl) oxazolidine and 2-isopropyl-3-(2-hydroxypropyl)-5-methyloxazolidine.

The oxazolidine compound(e) is hydrolyzed with moisture to generate imino and hydroxyl groups, and these groups react with isocyanate groups of the prepolymer to form urea and urethane linkages and the cross-linking proceeds.

The N-hydroxyalkyl-oxazolidine compound(e) is preferably used in such an amount that the NCO/OH equivalent ratio of the isocyanate group(b), excepting that for reacting with the compound having active hydrogens(c) and the monools(d), to the hydroxyl group in the oxazolidine compound(e) becomes 2 to 10. The NCO/OH equivalent ratios of less than 2 are not preferred because only undesirable physical properties of cured products are obtained. The NCO/OH equivalent ratios of more than 10 are not preferred because foaming takes place when the curing proceeds.

The oxazolidine compound(e) is more preferably used in such an amount that the NCO/OH equivalent ratio is in the range of 3 to 6 from the viewpoint of achieving good physical properties of cured products and controlling foaming.

The ring opening reaction of the oxazolidine ring is accelerated with an oxazolidine-ring opening accelerator(g). Examples of the oxazolidine-ring opening accelerator include inorganic acid such as hydrochloric acid, nitric acid, sulfuric acid and phosphoric acid and silicic acid; organic acids such as propionic acid, octanoic acid, adipic acid, succinic acid, maleic acid, phthalic acid, benzoic acid, organic sulfonic acid and their amides such as p-toluene sulfonic acid and its amide, o-toluene sulfonic acid and its amide, anhydride thereof, ester thereof including isocyanate such as p-toluenesulfonyl isocyanate; halogenide thereof and the like which can be hydrolyzed with moisture to form free acids. These are generally used as catalysts which accelerate the hydrolysis of the oxazolidine rings.

The amount of the oxazolidine-ring opening accelerator used is usually 0.01 to 3.0% by weight and, in view of prevention of foaming and stability during storage, preferably 0.05 to 1.0% by weight based on the whole composition.

The urethane prepolymer(a) of the present invention may be prepared under usual conditions for production of urethane prepolymers, and is prepared by reacting the compound having active hydrogens(c), monool(d) and N-hydroxyalkyl-oxazolidine compound(e) with an excessive amount of the polyisocyanate(b). For example, a prepolymer having a terminal isocyanate group can be obtained by reacting the polyisocyanate compound with the polyol under a nitrogen stream at temperatures of 50 to 80° C. for one to several hours.

The terminal isocyanate group content of the urethane prepolymer(a) is preferably 0.5 to 5.0% by weight based of the whole composition from the viewpoints of the desired viscosity of the prepolymer and the desired physical properties of the cured products, and more preferably 1.0 to 4.0% by weight based of the whole composition. The content of the urethane prepolymer in the composition of the present invention is preferably 10 to 90% by weight from the viewpoint of the physical properties of the cured products, and more preferably 20 to 70% by weight.

The hydrophobic fine powder silica(f) used as a thixotropic agent in the present invention is that prepared by subjecting the fine powder silica having a primary mean particle diameter of 50 $\mu$m or less obtained by known methods such as a wet method, a flame hydrolysis method, an arc method and a plasma method to a hydrophobic surface treatment so that the hydrophobic degree becomes 30% or more, preferably 40% or more, and more preferably 50% or more.

The hydrophobic degree is a number determined by the following method. Namely, 0.2 g of a sample is weighed and fed into a 100-ml beaker, and then 50 ml of pure water is also added thereto. Methanol is added under the liquid surface with electromagnetic stirring, and when sample is no longer detected on the liquid surface is recognized to be the end point. The number calculated from the amount of methanol consumed, A (ml), by using the formula: $[A/(50+A)] \times 100$ is the hydrophobic degree.

Specific examples of the hydrophobic fine powder silica (f) include Aerosil R972 (about 50% of hydrophobic degree), Aerosil R972V (about 50% of hydrophobic degree), Aerosil R972CF (about 50% of hydrophobic degree), Aerosil R974 (about 45% of hydrophobic degree), Aerosil R805 (about 50% of hydrophobic degree), Aerosil R812 (about 60% of hydrophobic degree), Aerosil R812S (about 70% of hydrophobic degree), Aerosil RX200 (about 70% of hydrophobic degree), Aerosil R202 (about 70% of hydrophobic degree), Aerosil RY200 (about 70% of hydrophobic degree) and Aerosil RY200S (about 70% of hydrophobic degree), all being sold by Nippon Aerosil Co., which are hydrophobic fine powder silicas prepared through the surface treatment using surface-treating agents such as halogenated silanes, alkoxysilanes, silazanes, siloxanes (dimethylsilicone oil). Among these, the hydrophobic fine powder silica obtained by the surface treatment of the siloxanes (dimethylsilicone oil) is preferred because of its effect to provide thixotropy.

The content of the hydrophobic fine powder silica in the composition of the present invention is preferably 0.1 to 20% by weight based of the whole composition from the viewpoint of the viscosity of the composition, more preferably 0.5 to 10% by weight and particularly 1.0 to 7% by weight.

In addition to the aforementioned components, to the composition of the present invention may be incorporated, if desired, organic solvents such as xylene, toluene and mineral spirit in an amount of generally 0 to 30% by weight, preferably 0 to 20% by weight and more preferably 0 to 15% by weight, inorganic fillers such as calcium carbonate, silicon oxide, titanium oxide, clay, talc and carbon black in an amount of generally 20 to 60% by weight, preferably 25 to 50% by weight and plasticizers such as dibutyl phthalate, dioctyl phthalate and dioctyl adipate in an amount of generally 0 to 30% by weight unless the purpose of the present invention is unsuited.

Furthermore, there can optionally be employed curing catalysts and various additives such as coupling agents, antifoams, levelling agents, delustering agents, flame retardants, dispersants, adhesive agents, antistatic agents, reaction decelerators, dehydrators, antioxidants, ultraviolet absorbers, hydrolysis inhibitors, dyes, inorganic pigments, organic pigments, extenders, etc.

EXAMPLES

The present invention will be further explained by the following examples and comparative examples to which the present invention is not limited.

Example 1
1) Synthesis of Urethane Prepolymer 552 parts by weight of polyoxypropylenediol having an average molecular weight of 3000, 184 parts by weight of polyoxypropylenetriol having an average molecular weight of 3000 and 83 parts by weight of polyoxypropylenemonool having an average molecular weight of 1000 (each of the three alcohols contains 0.03% or less of moisture) are reacted with 155 parts by weight of 4,4'-diphenylmethane diisocyanate in a flask, in a nitrogen atmosphere, at 80° C. for 2 hours under stirring. Subsequently, 0.01 part by weight of dibutyltin dilaurate and 26 parts by weight of 2-isopropyl-3-(2-hydroxyethyl)oxazolidine were added to the mixture and reacted at 50° C. for 3 hours to produce a urethane prepolymer having a terminal NCO group content of 1.74% by weight.

2) Preparation of One-Package Thixotropic Polyurethane Resin Composition 400 parts by weight of the thus obtained prepolymer, 300 parts by weight of dried calcium carbonate, 50 parts by weight of dried titanium oxide, 100 parts by weight of dioctyl phthalate, 100 parts by weight of xylene, 45 parts by weight of hydrophobic fine powder silica (produced by Nippon Aerosil Co.; Aerosil R202) and 3 parts by weight of p-toluenesulfonyl isocyanate were fed into a planetary mixer, and were kneaded under vacuum to produce a one-package thixotropic polyurethane resin composition.

Example 2
1) Synthesis of Urethane Prepolymer 559 parts by weight of polyoxypropylenetriol having an average molecular weight of 5000 and 262 parts by weight of polyoxypropylenemonool having an average molecular weight of 1000 (each of the two alcohols contains 0.03% or less of moisture) are reacted with 124 parts by weight of tolylene diisocyanate (the ratio of the 2,4-form to the 2,6-form is 8/2) in a flask, in a nitrogen atmosphere, at 80° C. for 3 hours under stirring. Subsequently, 0.05 part by weight of dibutyltin dilaurate and 55 parts by weight of 2-phenyl-3-(2-hydroxyethyl)oxazolidine were added to the mixture and reacted at 50° C. for 3 hours to produce a urethane prepolymer having a terminal NCO group content of 2.15% by weight.

2) Preparation of One-Package Thixotropic Polyurethane Resin Composition

A one-package thixotropic polyurethane resin composition was obtained using the same formulation and method as those of Example 1, except for replacing the urethane prepolymer of Example 1 with that of Example 2 and for replacing the hydrophobic fine powder silica of Example 1 (produced by Nippon Aerosil Co.; Aerosil R202) with that of Example 2 (produced by Nippon Aerosil Co.; Aerosil RY200).

Example 3
1) Synthesis of Urethane Prepolymer 843 parts by weight of polyoxypropylenediol having an average molecular weight of 3000 and 28 parts by weight of polyoxypropylenemonool having an average molecular weight of 1000 (each of the two alcohols contains 0.03% or less of moisture) are reacted with 104 parts by weight of xylylene diisocyanate in a flask, in a nitrogen atmosphere, at 80° C. for 3 hours under stirring. Subsequently, 0.03 part by weight of dibutyltin dilaurate and 25 parts by weight of 2-isopropyl-3-(2-hydroxyethyl)oxazolidine were added to the mixture and reacted at 50° C. for 3 hours to produce a urethane prepolymer having a terminal NCO group content of 1.35% by weight.

2) Preparation of One-Package Thixotropic Polyurethane Resin Composition 500 parts by weight of the thus obtained prepolymer, 350 parts by weight of dried calcium carbonate, 50 parts by weight of dried titanium oxide, 50 parts by weight of xylene, 50 parts by weight of hydrophobic fine powder silica (produced by Nippon Aerosil Co.; Aerosil RY200S) and 1 part by weight of p-toluenesulfonyl isocyanate were fed into a planetary mixer, and were kneaded under vacuum to produce a one-package thixotropic polyurethane resin composition.

Example 4
1) Synthesis of Urethane Prepolymer 640 parts by weight of polyoxypropylenediol having an average molecular weight of 3000, 141 parts by weight of polyoxypropylenetriol having an average molecular weight of 5000 and 86 parts by weight of polyoxypropylenemonool having an average molecular weight of 1000 (each of the three alcohols contains 0.03% or less of moisture) are reacted with 106 parts by weight of xylylene diisocyanate in a flask, in a nitrogen atmosphere, at 80° C. for 3 hours under stirring. Subsequently, 0.03 part by weight of dibutyltin dilaurate and 27 parts by weight of 2-isopropyl-3-(2-hydroxyethyl) oxazolidine were added to the mixture and reacted at 50° C. for 3 hours to produce a urethane prepolymer having a terminal NCO group content of 1.40% by weight.

2) Preparation of One-Package Thixotropic Polyurethane Resin Composition

A one-package thixotropic polyurethane resin composition was obtained using the same formulation and method as those of Example 3, except for replacing the urethane prepolymer of Example 3 with that of Example 4.

Example 5
1) Synthesis of Urethane Prepolymer 677 parts by weight of polyoxypropylenetriol having an average molecular weight of 5000, 136 parts by weight of polyoxypropylenemonool having an average molecular weight of 1000 (each of the two alcohols contains 0.03% or less of moisture) and 11 parts by weight of 2-ethylhexanol are reacted with 125 parts by weight of xylylene diisocyanate in a flask, in a nitrogen atmosphere, at 80° C. for 3 hours under stirring. Subsequently, 0.03 part by weight of dibutyltin dilaurate, 19 parts by weight of pentaerythritol triacrylate and 32 parts by weight of 2-isopropyl-3-(2-hydroxyethyl)oxazolidine were added to the mixture and reacted at 50° C. for 3 hours to produce a urethane prepolymer having a terminal NCO group content of 1.64% by weight.

2) Preparation of One-Package Thixotropic Polyurethane Resin Composition

A one-package thixotropic polyurethane resin composition was obtained using the same formulation and method as those of Example 3, except for replacing the urethane prepolymer of Example 3 with that of Example 5.

Comparative Example 1

1) Synthesis of Urethane Prepolymer 602 parts by weight of polyoxypropylenediol having an average molecular weight of 3000, 201 parts by weight of polyoxypropylenetriol having an average molecular weight of 3000 and 72 parts by weight of polyoxypropylenemonool having an average molecular weight of 1000 (each of the three alcohols contains 0.03% or less of moisture) are reacted with 125 parts by weight of 4,4'-diphenylmethane diisocyanate in a flask, in a nitrogen atmosphere, at 80° C. for 2 hours under stirring. Subsequently, 0.01 part by weight of dibutyltin dilaurate was added to the mixture and reacted for 1 hour to produce a urethane prepolymer having a terminal NCO group content of 1.26% by weight.

2) Preparation of One-Package Thixotropic Polyurethane Resin Composition

A one-package thixotropic polyurethane resin composition was obtained using the same formulation and method as those of Example 1, except for replacing the urethane prepolymer of Example 1 with that of Comparative Example 1.

Comparative Example 2

1) Synthesis of Urethane Prepolymer 841 parts by weight of polyoxypropylenediol having an average molecular weight of 3000 (the alcohol contains 0.03% or less of moisture) is reacted with 113 parts by weight of tolylene diisocyanate (the ratio of the 2,4-form to the 2,6-form is 8/2) in a flask, in a nitrogen atmosphere, at 80° C. for 3 hours under stirring. Subsequently, 0.05 part by weight of dibutyltin dilaurate and 46 parts by weight of 2-phenyl-3-(2-hydroxyethyl)oxazolidine were added to the mixture and reacted at 50° C. for 3 hours to produce a urethane prepolymer having a terminal NCO group content of 2.00% by weight.

2) Preparation of One-Package Thixotropic Polyurethane Resin Composition

A one-package thixotropic polyurethane resin composition was obtained using the same formulation and method as those of Example 1, except for replacing the urethane prepolymer of Example 1 with that of Comparative Example 2.

Comparative Example 3

1) Synthesis of Urethane Prepolymer 459 parts by weight of polyoxypropylenediol having an average molecular weight of 3000, 306 parts by weight of polyoxypropylenetriol having an average molecular weight of 3000 and 138 parts by weight of polyoxypropylenemonool having an average molecular weight of 1000 (each of the three alcohols contains 0.03% or less of moisture) are reacted with 97 parts by weight of xylylene diisocyanate in a flask, in a nitrogen atmosphere, at 80° C. for 3 hours under stirring. Subsequently, 0.03 part by weight of dibutyltin dilaurate was added to the mixture and reacted for 2 hours to produce a urethane prepolymer having a terminal NCO group content of 1.05% by weight.

2) Preparation of One-Package Thixotropic Polyurethane Resin Composition

A one-package thixotropic polyurethane resin composition was obtained using the same formulation and method as those of Example 3, except for replacing the urethane prepolymer of Example 3 with that of Comparative Example 3.

Comparative Example 4

1) Synthesis of Urethane Prepolymer 873 parts by weight of polyoxypropylenediol having an average molecular weight of 3000 (the alcohol contains 0.03% or less of moisture) is reacted with 102 parts by weight of xylylene diisocyanate in a flask, in a nitrogen atmosphere, at 80° C. for 3 hours under stirring. Subsequently, 0.03 part by weight of dibutyltin dilaurate and 25 parts by weight of 2-isopropyl-3-(2-hydroxyethyl) oxazolidine were added to the mixture and reacted at 50° C. for 3 hours to produce a urethane prepolymer having a terminal NCO group content of 1.33% by weight.

2) Preparation of One-Package Thixotropic Polyurethane Resin Composition

A one-package thixotropic polyurethane resin composition was obtained using the same formulation and method as those of Example 3, except for replacing the urethane prepolymer of Example 3 with that of Comparative Example 4.

Comparative Example 5

A one-package thixotropic polyurethane resin composition was obtained using the same formulation and method as those of Example 1, except for replacing the hydrophobic fine powder silica of Example 1 (produced by Nippon Aerosil Co.; Aerosil R202) with the hydrophilic fine powder silica (produced by Nippon Aerosil Co.; Aerosil 200 with 30% or less of hydrophobic degree).

Comparative Example 6

500 parts by weight of the prepolymer of Example 3, 400 parts by weight of surface-treated calcium carbonate (produced by Maruo Calcium Co., Ltd.; Sealets 200), 50 parts by weight of dried titanium oxide, 50 parts by weight of xylene and 1 part by weight of p-toluenesulfonyl isocyanate were fed into a planetary mixer, and were kneaded under vacuum to produce a one-package thixotropic polyurethane resin composition.

Method for Evaluation of Properties of Composition

Properties of the one-package thixotropic polyurethane resin compositions obtained in Examples 1 to 5 and Comparative Examples 1 to 6 were evaluated by the following methods:

1) Curability

A polyurethane resin composition was first placed onto an aluminum board and molded, with a metal spatula, into a specimen approximately 10 mm thick×20 mm wide×40 mm long. After being left at 25° C. in 50% RH for 24 hours, a cured depth from its upper surface toward interior was measured.

2) Storage Stability

In accordance with the extrusion test method using a test cartridge set forth in JIS A 1439 (1997), the extrusion time (second) was measured initially and after two week storage at 50° C. The appearance of the one-package thixotropic polyurethane resin composition was also observed.

3) Foaming

A polyurethane resin composition was first placed onto plywood and molded, with a metal spatula, into a specimen approximately 10 mm thick×20 mm wide×40 mm long. After being left at 40° C. in 80% RH for 24 hours, the presence or absence of foaming inside the specimen was observed.

4) Physical Properties of Cured Product

In accordance with the tensile property test method set forth in JIS A 1439 (1997), 100% modulus was measured. An aluminum board and Takenate M-402 were employed as a substrate and a primer, respectively.

The evaluation results are given in the following Tables 1 and 2.

TABLE 1

|  |  | Example 1 | Example 2 | Example 3 | Example 4 | Example 5 |
|---|---|---|---|---|---|---|
| Curability (mm) |  | 2.5 | 2.0 | 2.0 | 2.0 | 2.5 |
| Storage stability | Initial extrusion property (second) | 4 | 3 | 4 | 4 | 4 |
|  | Extrusion property after 2 week storage at 50° C. (second) | 4 | 3 | 5 | 5 | 5 |
|  | Appearance after 2 week storage at 50° C. (second) | No abnormality | No abnormality | No abnormality | No abnormality | No abnormality |
| Foaming |  | None | None | None | None | None |
| 100% Mo (N/mm$^2$) |  | 0.32 | 0.34 | 0.24 | 0.23 | 0.27 |

TABLE 2

|  |  | Comparative Example 1 | Comparative Example 2 | Comparative Example 3 | Comparative Example 4 | Comparative Example 5 | Comparative Example 6 |
|---|---|---|---|---|---|---|---|
| Curability (mm) |  | 0.5 | 2.5 | 0.5 | 2.0 | 2.5 | 2.0 |
| Storage stability | Initial extrusion property (second) | 4 | 3 | 4 | 4 | 4 | 4 |
|  | Extrusion property after 2 week storage at 50° C. (second) | 4 | 4 | 4 | 5 | 11 | 9 |
|  | Appearance after 2 week storage at 50° C. (second) | No abnormality | No abnormality | No abnormality | No abnormality | No abnormality | Granular solid was observed. |
| Foaming |  | Observed | None | Observed | None | None | None |
| 100% Mo (N/mm$^2$) |  | 0.25 | 0.58 | 0.24 | 0.44 | 0.33 | 0.25 |

The compositions of Examples 1 to 5 caused no foam and had good curabilities, and additionally exhibited 100% modulus of 0.40 N/mm$^2$ or less which corresponded to performances of low modulus type sealants set forth in JIS A 5758 (1997). These compositions have achieved suitable performances for the use as low modulus type sealants. Storage stabilities of the compositions were also good.

The compositions of Comparative Examples 1 and 3, which did not contain any oxazolidine compound, have foamed and resulted in poor curabilities in comparison with the compositions of Examples containing the oxazolidine compounds.

The compositions of Comparative Examples 2 and 4, which did not contain any monool, exhibited effects in increase in curability and control of foaming due to oxazolidine compound, but resulted in high 100% modulus, therefore, they could show only unsuitable physical properties for low modulus type sealants. The compositions of Comparative Examples 5 and 6, which were prepared using, as a thixotropic agent, hydrophilic fine powder silica or surface-treated calcium carbonate in place of hydrophobic fine powder silica, exhibited so poor storage stabilities that the extrusion time (second) increased due to raise in viscosity and the appearance was deteriorated due to the aggregated solid particles.

We claim:

1. A one-package thixotropic polyurethane sealant comprising:

10 to 90% by weight of a urethane prepolymer having a terminal free isocyanate group (a) which is obtained by reacting a polyisocyanate (b) with a compound having two or more active hydrogens (c), a mono-ol (d) and an N-hydroxyalkyl-oxazolidine compound (e), 0.1 to 20% by weight of hydrophobic fine powder silica (f), and 0.01 to 3.0% by weight of an oxazolidine-ring opening accelerator (g), wherein the component (a) is obtained in 1.5 to 4.5 of an NCO/H equivalent ratio of an NCO group in the component (b) relative to an active hydrogen in the component (c), 3 to 40 of an NCO/OH equivalent ratio of an NCO group in the component (b) relative to an OH group in the component (d) and 3 to 6 of an NCO/OH equivalent ratio of an NCO group in the component (b), excepting that for reacting with the active hydrogen in the component (c) and the OH group in the component (d), relative to an OH group in the component (e).

2. The one-package thixotropic polyurethane sealant according to claim 1, wherein the component (f) has a hydrophobic degree of 30% or more.

3. The one-package thixotropic polyurethane sealant according to claim 1, wherein the component (d) has an average molecular weight of 100 to 3000.

4. The one-package thixotropic polyurethane sealant according to claim 1, wherein the component (a) has an isocyanate group content of 0.5 to 5.0% by weight based on the whole composition.

5. The one-package thixotropic polyurethane sealant according to claim 1, wherein the component (e) is a compound represented by the formula (I):

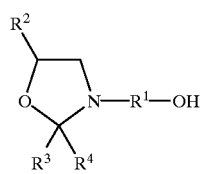
(I)
wherein $R^1$ represents a $C_{2-5}$ alkylene group, $R^2$ represents a hydrogen or a $C_{1-3}$ alkyl group, and $R^3$ and $R^4$ are identical or different and represent a hydrogen or a $C_{1-20}$ hydrocarbon group.
* * * * *